United States Patent [19]

Fister, Jr. et al.

[11] 4,164,434
[45] Aug. 14, 1979

[54] ALUMINUM ALLOY CAPACITOR FOIL AND METHOD OF MAKING

[75] Inventors: Julius C. Fister, Jr., Hamden; John F. Breedis, Trumbull, both of Conn.

[73] Assignee: Swiss Aluminium Ltd., Chippis, Switzerland

[21] Appl. No.: 847,782

[22] Filed: Nov. 2, 1977

[51] Int. Cl.² ............... C22F 1/04; C22C 21/00
[52] U.S. Cl. ........................... 148/2; 75/138; 148/11.5 A; 148/32
[58] Field of Search ............. 75/138, 139, 141–144, 75/146–148; 148/2, 11.5 A, 32

[56] References Cited

U.S. PATENT DOCUMENTS 3,676,111   7/1972   Wieser et al. ............... 75/138

Primary Examiner—R. Dean
Attorney, Agent, or Firm—Bachman and LaPointe

[57] ABSTRACT

Improved aluminum alloys are disclosed which are particularly useful as foil material in electrical capacitors. These alloys may contain either titanium in an aluminum base or a titanium and boron mixture in an aluminum base. The particular combination of titanium and boron presents a greater increase in capacitance in foil formed from this alloy than the increase in capacitance due to titanium or boron alone. Particular processing of such alloys is also disclosed.

33 Claims, No Drawings

ALUMINUM ALLOY CAPACITOR FOIL AND METHOD OF MAKING

BACKGROUND OF THE INVENTION

Electrical capacitor manufacturers frequently utilize aluminum foil in the production of their capacitors to reduce both the weight and overall size of the capacitors. The aluminum foil provides a large surface area in a relatively small amount of space within the capacitor container. This surface area of the aluminum foil is usually enhanced through the use of chemical or electrochemical etching of the foil to develop what are known as submicron-diameter tunnel networks. The increased surface area provided by such etching, in combination with the electrical insulation provided by a subsequently formed anodic film on the surface of the foil, is responsible for high capacitance levels attained by the foil per unit area of foil.

Generally speaking, only high purity aluminum is utilized as the foil material in capacitors. The etching response of such foil depends upon the conditions set forth by the capacitor manufacturer and is determined by both the foil composition and the processing utilized to make the foil. For low voltage applications (below 100 volts) where a leakage current from the capacitor is not as crucial as high voltage applications, the lower purity and less expensive aluminum grades such as AA 1188 or 1193 are generally employed. The cold rolled −H19 temper is preferred over the −0 temper condition for foil utilized in this particular voltage range. This preferance is due to the finer scale tunnel networks which develop on the surface of the foil with cold worked tempers. A full advantage of the etched tunnel networks can be realized in the low voltage applications since the anodic films employed in the capacitor foil manufacture generally do not completely seal the tunnel networks.

Capacitor manufacturing is a very highly cost competitive industry and metal suppliers who can provide aluminum foil which is capable of attaining high capacitance for the least amount of metal utilized in the foil have a greater sales advantage over competitors. One method for providing such increased capacitance in fairly low purity aluminum foils is the addition of certain elements which act to enhance the capacitance of the alloys to which they are added. For example, U.S. Pat. No. 3,498,765 describes a 78% improvement in capacitance levels over high purity aluminum utilizing a 70 ppm (parts per million) cadmium addition to the aluminum. This patent further discusses a 10% improvement in capacitance over high purity aluminum through the addition of 60 ppm indium to the base aluminum. U.S. Pat. No. 3,997,339 describes enhanced etch pore density and, therefore, increased capacitance in annealed aluminum foil which contains one or more of the elements antimony, barium or zinc in quantities of 5 to 200 ppm and at most 0.5 ppm of lead and bismuth plus at most 2 ppm of calcium and chromium.

It is therefore an object of the present invention to provide an aluminum alloy which exhibits improved capacitance levels in cold worked tempers.

It is a further object of the present invention to provide an alloy as above which attains this increased capacitance through the utilization of specific elemental additions to the aluminum.

It is a further object of the present invention to provide a foil prepared from an alloy as above which provides a desirable combination of high capacitance levels and low cost.

Further objects and advantages of the present invention will become more apparent from a consideration of the following specification.

SUMMARY OF THE INVENTION

The objects described hereinabove are accomplished by providing an alloy formed from high purity aluminum and either titanium or titanium plus boron as an elemental addition. The titanium by itself acts to increase the capacitance of the aluminum relative to a control without the titanium while the titanium plus boron addition provides an unexpected and synergistic increase in capacitance relative to the control aluminum.

DETAILED DESCRIPTION

The alloy system of the present invention includes from 0.005 to 0.03% by weight titanium. This weight percentage may also be expressed as 50 to 300 ppm titanium in the alloy system. The titanium may also be added to the base system in combination with boron; from 0.005 to 0.03% by weight titanium with 0.001 to 0.006% by weight boron. Other elements may also be present within the alloy system, but care should be taken to limit their extent so that the capacitance level of foil formed from the alloy is not reduced. For example, a maximum of 0.5% by weight for each of silicon and iron may be present in the alloy. The alloy may also include up to 0.1% by weight copper, up to 0.05% by weight for each of manganese and magnesium and up to 0.01% by weight for each of chromium, nickel and zinc. Preferably, the alloy system of the present invention includes from 0.01 to 0.017% by weight titanium, either by itself or in combination with 0.003 to 0.005% by weight boron. The preferred alloy system may contain from 0.002 to 0.04% by weight for each of silicon and iron and approximately 0.005% by weight for each of the other elements named above.

The alloy system of the present invention may be cast by any convenient method. Care should be taken, however, to insure that no undesired elements enter the system as impurities. Care should also be taken that the alloy be kept clean throughout the casting procedure.

The cast ingots should be carefully cleaned (scalped) to remove any visible impurities. The scalped ingots may then be homogenized at a temperature ranging from 850° to 1175° F. for at least ½ hour. It is preferred that the ingots be homogenized at 1100° F. (±10° F.) for approximately 10 hours. The ingots may then be hot worked at 450° to 1100° F., followed by a 50° F. per hour minimum rate water quenching before cold working. It is preferred that the ingots be hot worked between 950° and 1100° F. The quenching rate noted above is a minimum rate. It is preferred that the alloys receive an immediate quench or at least a 1000° F. per hour quenching.

The alloys are then subjected to cold working with a minimum reduction of 80% required. It is preferred that the alloys be cold worked to a minimum of 99% reduction. The final gage of the alloys attained from the cold working should be between 0.0001 and 0.425". The preferred final gage should range between 0.001 and 0.01".

The temper of the foil depends upon the voltage in the capacitor in which the foil is placed. Low voltage capacitors generally require hard temper foil while high voltage capacitors generally require foil which has been softened by annealing. The foil produced from the alloy of the present invention may be formed into various tempers depending upon the final use.

In order to determine correct capacitance values for both control foils and foils produced from the alloys of the present invention, it is necessary to devise a measuring method to reduce substantially the possibility of error. Previous methods of measuring capacitance in aluminum alloy foil have provided wide variations in capacitance values. Therefore, the following method of capacitance measurement was utilized.

An etching solution composed of 230 grams per liter (gpl) recrystallized salt plus 8 gpl $Na_2SO_4$ in distilled water was prepared. This solution was heated to 95° C. in a 4 liter beaker and aged for at least 2 hours before inserting the cleaned samples into the bath. Each sample was cut and degreased by wiping the sample surfaces with benzene. The samples were rinsed with methanol and air dried. The samples were then immersed for 80 seconds in a 5 gpl NaOH solution at 40° C. to clean the samples. They were then rinsed in flowing distilled water and mounted on a masked etching frame to provide a cathode area of 2" by 3" for each sample. The etching frame with the included sample for each alloy was placed in the etching beaker and the current leads were then connected. The samples were etched at 14.88 amperes for 203 seconds within 10 seconds after the samples were immersed in the baths. The samples were then removed from the etching bath, rinsed in flowing distilled water and immersed in a 2 to 1 $HNO_3$, solution at room temperature for 90 seconds. They were then rinsed in flowing distilled water and oven dried at 70° C. for approximately 10 minutes. Each sample was then stored in a desiccator until ready to form for measurement.

The samples were cut to size and placed in a 30 gpl solution of ammonium tartrate with a pH of 5.5 in a 1 liter beaker with 2 aluminum sheet cathodes. The samples were formed at a 1 ampere constant current to 30 volts. The forming process was continued at 30 volts until the current dropped to 30 milliamperes. Each sample was then removed from the forming solution, rinsed in distilled water and oven dried at 70° C. for approximately 10 minutes.

The samples were then prepared for measurement by masking each sample with electroplaters tape on both sides to expose a 1" by 2" area on the samples. Each sample was measured in a 1 liter beaker containing 30 gpl ammonium tartrate solution at a pH of 5.5 to 5.8. The counter electrode in the beaker was a cylindrical aluminum 1199 alloy sheet formed to fit the inner diameter of the beaker. Each sample was then rinsed in distilled water and dried. The sample area was measured using graph paper and a measurement of the slope of the voltage/time forming curve at 30 volts was taken. This measurement was expressed as seconds per volts.

Corrections were made to the measurements by measuring the counter electrode capacitance according to the following formula:

$$C_C = \frac{C_{12} C_T (2 - f)^2}{C_{12}(2 - f)^2 - C_T(1 - f)} \quad (I)$$

Where, $C_C$ = counter electrode capacitance in $\mu f$;

$C_{12}$ = capacitance value between sample capacitance ($C_1$, $C_2$) and counter electrode capacitance;

$C_T$ = combined capacitance of individual sample capacitance ($C_1 + C_2$); and f = capacitance difference between samples divided by capacitance of 1 sample.

Please note that the capacitance values in the formula are used as $\mu f$ and not as $\mu f$ per square inch. The capacitance values were corrected to a standard counter electrode capacitance value of 2600 $\mu f$ or 99 $\mu f/in^2$. The capacitance of any sample in the sequence would therefore be given by the following formula:

$$C_S = \frac{99 C_i}{C_1 - \left(\frac{C_1 - C_n}{n - 1}\right)(i - 1)} \quad (II)$$

Where, $C_S$ = sample capacitance in $\mu f/in^2$;

$C_i$ = measured capacitance of the sample in the ith position in the measured sequence after correcting for the counter electrode effect in $\mu f/in^2$;

$C_1$ = measured value for the first sample;

$C_n$ = measured value for the last sample;

i = number of the particular sample at a particular point in the sequence; and n = number of the last sample in the sequence.

Please note that n = i when it is the last sample being measured.

Further objects and advantages of the present invention will become more apparent from a consideration of the following illustrative examples.

EXAMPLE I

Various amounts of titanium, boron and a titanium plus boron master alloy were added to an aluminum alloy control containing 0.0008% Si, 0.0016% Fe, 0.0004% Cu, 0.0003% Mn, 0.0002% Mg, 0.002% Zn, 0.0003% B, a trace of Ti and balance Al. These elements were added in such amounts so as to form the analyzed compositions as shown in Table I. The Ti and B were each added as master alloys and the Ti plus B was added as a master alloy with a 5 to 1 ratio of Ti to B. Five pound Durville ingots of each alloy were prepared and an ingot containing no Ti or B addition was prepared for use as a control.

0.05" was scalped from the rolling surfaces of the 1.75" by 4" by 4" ingots and the scalped ingots were then homogenized at 1100° F. ±10° F. for 10 hours. The ingots were then hot rolled at approximately 950° F. with a reheating between each pass to a final thickness of 0.425". The hot rolled ingots were then water quenched and cold rolled down to a final thickness of 0.0035".

The capacitance of each foil sample was then measured and compared to the capacitance of the control sample. The results are shown in Table I.

TABLE I

Effects On Capacitance In Aluminum Foil Containing Added Elements

| Element Added (wt. %) | Analyzed Amount (wt. %) | Capacitance ($\mu f/in^2$) |
| --- | --- | --- |
| None (Control) | 0.0003% B | 91.1 |
| Ti (0.0015) | 0.0017 | 102.7 |
| (0.015) | 0.014 | 106.5 |
| B (0.003) | 0.0025 | 86.4 |
| (0.015) | 0.0068 | 83.3 |

TABLE I-continued

Effects On Capacitance In Aluminum Foil Containing Added Elements

| Element Added (wt. %) | Analyzed Amount (wt. %) | Capacitance (μf/in²) |
|---|---|---|
| Ti (0.015) + B (0.003) | 0.013 Ti + <0.001 B | 112.4 |

The results shown in Table I indicate that titanium additions alone improve the capacitance of base aluminum alloy foil while boron additions alone slightly decrease the capacitance of the foil. It is important to note that the most significant improvement in capacitance was found with combined additions of titanium plus boron. It can readily be seen that there is a synergistic effect obtained from this combined addition of titanium plus boron since it would be expected that a boron addition to titanium would detrimentally affect the titanium capacitance enhancement.

EXAMPLE II

Ingots containing the elements shown in Table II were prepared and processed as described in Example I. The resultant capacitance values are shown in Table II.

TABLE II

EFFECTS ON CAPACITANCE IN ALUMINUM FOIL CONTAINING ADDED ELEMENTS

| Alloy Identification | Analyzed Composition (Wt. %) | | | | Element(s) Added | Capacitance in μf/in² |
| --- | --- | --- | --- | --- | --- | --- |
| | Si | Fe | B | Ti | | |
| 37-1 | 0.033 | 0.03 | 0.0014 | 0.0042 | — | 71.4 |
| 37-2 | 0.036 | 0.032 | 0.004 | 0.015 | 0.015 Ti + 0.003 B | 92.0 |
| 41-1-A | 0.045 | 0.036 | 0.0038 | 0.032 | 0.03 Ti + 0.006 B | 68.5 |
| 41-1-B | 0.044 | 0.038 | 0.0068 | 0.046 | 0.045 Ti + 0.009 B | 64.5 |
| 37-3 | 0.016 | 0.033 | 0.0011 | 0.00165 | — | 108.3 |
| 37-4 | 0.0175 | 0.035 | 0.0043 | 0.014 | 0.015 Ti + 0.003 B | 114.7 |
| 47-1 | 0.023 | 0.04 | <0.001 | 0.0084 | 0.0084 Ti + 0.0017 B | 113 |
| 47-2 | 0.022 | 0.042 | <0.001 | 0.0096 | 0.0084 Ti | 105.3 |
| 47-3 | 0.023 | 0.042 | <0.001 | <0.002 | 0.003 B | 102.3 |
| 41-2-A | 0.078* | 0.045 | 0.005 | 0.026 | 0.03 Ti + 0.006 B | 47.9 |
| 41-2-B | 0.06* | 0.043 | 0.008 | 0.04 | 0.045 Ti + 0.009 B | 64 |

*Uncertain analysis for Si due to instrument breakdown.

The results of Table II indicate that the synergistic titanium plus boron effect upon the capacitor foil appears to be most significant at a titanium level of 0.014 to 0.015% with a boron level of 0.004%. Increasing the amounts of titanium and boron substantially above these values results in a drop in the capacitance of the foil. These results also indicate that the synergistic effect of titanium plus boron found previously (Example I) in high purity aluminum can also be observed in the 1193 type alloys utilized in Example II.

Thus, it can be seen from these examples that titanium or a combination of titanium plus boron enhances the capacitance of aluminum alloy foil and enables the substitution of less expensive alloy foils for expensive high purity aluminum in capacitor uses. It should be stressed again that the combination of titanium plus boron exhibits a surprising and synergistic effect upon the capacitance of the base alloy to which the combination is added.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An aluminum alloy foil having a significant increase in capacitance properties which is particularly useful as foil material in electrical capacitors, said alloy consisting essentially of from 0.005 to 0.03% by weight titanium, balance aluminum.

2. An alloy foil according to claim 1 wherein an element selected from the group consisting of up to 0.5% by weight for each of silicon and iron, up to 0.1% by weight copper, up to 0.05% by weight for each of manganese and magnesium, up to 0.01% by weight for each of chromium, nickel and zinc, and mixtures thereof, is additionally present in said alloy.

3. An alloy foil according to claim 1 wherein said alloy consists essentially of from 0.01 to 0.017% by weight titanium, balance aluminum.

4. An alloy foil according to claim 2 wherein said element is selected from the group consisting of from 0.002 to 0.04% by weight for each of silicon and iron, 0.005% by weight for each of copper, manganese, magnesium, chromium, nickel and zinc, and mixtures thereof.

5. An aluminum alloy foil having a significant increase in capacitance properties which is particularly useful as foil material in electrical capacitors, said alloy consisting essentially of from 0.005 to 0.03% by weight titanium, from 0.001 to 0.006% by weight boron, balance aluminum.

6. An alloy foil according to claim 5 wherein an element selected from the group consisting of up to 0.5% by weight for each of silicon and iron, up to 0.1% by weight copper, up to 0.05% by weight for each of manganese and magnesium, up to 0.01% by weight for each of chromium, nickel and zinc, and mixtures thereof, is additionally present in said alloy.

7. An alloy foil according to claim 5 wherein said alloy consists essentially of from 0.01 to 0.017% by weight titanium, from 0.003 to 0.005% by weight boron, balance aluminum.

8. An alloy foil according to claim 6 wherein said element is selected from the group consisting of from 0.002 to 0.04% by weight for each of silicon and iron, 0.005% by weight for each of copper, manganese, magnesium, chromium, nickel and zinc, and mixtures thereof.

9. A process for producing aluminum alloy foil which exhibits high capacitance levels in cold worked tempers, said process comprising the steps of:

(a) casting an ingot of an aluminum alloy consisting essentially of from 0.005 to 0.03% by weight titanium, balance aluminum;
(b) cleaning and scalping said ingot to remove any visible impurities;
(c) homogenizing said ingot at a temperature ranging from 850° to 1175° F. for at least ½ hour;
(d) hot working said ingot at 450° to 1100° F.;
(e) cooling said ingot at a minimum cooling rate of 50° F. per hour; and
(f) cold working said ingot to foil with a minimum reduction of 80% to a final gage.

10. A process according to claim 9 wherein an element selected from the group consisting of up to 0.5% by weight for each of silicon and iron, up to 0.1% by weight copper, up to 0.05% by weight for each of manganese and magnesium, up to 0.01% by weight for each of chromium, nickel and zinc, and mixtures thereof, is additionally present in said alloy.

11. A process according to claim 9 wherein said alloy consists essentially of from 0.01 to 0.017% by weight titanium, balance aluminum.

12. A process according to claim 10 wherein said element is selected from the group consisting of from 0.002 to 0.04% by weight for each of silicon and iron, 0.005% by weight for each of copper, manganese, magnesium, chromium, nickel and zinc, and mixtures thereof.

13. A process according to claim 9 wherein said homogenizing is performed from 1090° to 1110° F. for approximately 10 hours.

14. A process according to claim 9 wherein said hot working is performed from 950° to 1100° F.

15. A process according to claim 9 wherein said cooling rate is at least 1000° F. per hour.

16. A process according to claim 9 wherein said cold working is performed with a minimum reduction of 99% to a final gage of between 0.001 and 0.01 inch.

17. A product produced by the process of claim 9.
18. A product produced by the process of claim 12.

19. A process for producing aluminum alloy foil which exhibits high capacitance levels in cold worked tempers, said process comprising the steps of:
(a) casting an ingot of an aluminum alloy consisting essentially of from 0.005 to 0.03% by weight titanium, from 0.001 to 0.006% by weight boron, balance aluminum;
(b) cleaning and scalping said ingot to remove any visible impurities;
(c) homogenizing said ingot at a temperature ranging from 850° to 1175° F. for at least ½ hour;
(d) hot working said ingot at 450° to 1100° F.;
(e) cooling said ingot at a minimum cooling rate of 50° F. per hour; and
(f) cold working said ingot to foil with a minimum reduction of 80% to a final gage.

20. A process according to claim 19 wherein an element selected from the group consisting of up to 0.5% by weight for each of silicon and iron, up to 0.1% by weight copper, up to 0.05% by weight for each of manganese and magnesium, up to 0.01% by weight for each of chromium, nickel and zinc, and mixtures thereof, is additionally present in said alloy.

21. A process according to claim 19 wherein said alloy consists essentially of from 0.01 to 0.017% by weight titanium, from 0.003 to 0.005% by weight boron, balance aluminum.

22. A process according to claim 20 wherein said element is selected from the group consisting of from 0.002 to 0.04% by weight for each of silicon and iron, 0.005% by weight for each of copper, manganese, magnesium, chromium, nickel and zinc, and mixtures thereof.

23. A process according to claim 19 wherein said homogenizing is performed from 1090° to 1110° F. for approximately 10 hours.

24. A process according to claim 19 wherein said hot working is performed from 950° to 1100° F.

25. A process according to claim 19 wherein said cooling rate is at least 1000° F. per hour.

26. A process according to claim 19 wherein said cold working is performed with a minimum reduction of 99% to a final gage of between 0.001 and 0.01 inch.

27. A product produced by the process of claim 19.
28. A product produced by the process of claim 22.

29. An alloy foil according to claim 1 wherein said foil is an etched capacitor foil having improved capacitance.

30. An alloy foil according to claim 5 wherein said foil is an etched capacitor foil having improved capacitance.

31. A process according to claim 9 wherein said cold working is performed to a final gage of between 0.0001 and 0.425 inch.

32. A process according to claim 19 wherein said cold working is performed to a final gage of between 0.0001 and 0.425 inch.

33. An aluminum alloy foil having a significant increase in capacitance properties which is particularly useful as foil material in electrical capacitors, said alloy consisting essentially of from 0.0015 to 0.03% by weight titanium, balance aluminum.

* * * * *